United States Patent [19]

Hamada

[11] 3,925,682

[45] Dec. 9, 1975

[54] CHATTERING IMMUNE CIRCUIT

[75] Inventor: Kenji Hamada, Yokohama, Japan

[73] Assignee: Alps Electric Co., Ltd., Tokyo, Japan

[22] Filed: Feb. 25, 1974

[21] Appl. No.: 445,355

[30] Foreign Application Priority Data

Mar. 26, 1973 Japan ................................ 48-34292

[52] U.S. Cl. ............ 307/134; 307/247 A; 328/162; 328/164; 328/165

[51] Int. Cl.² ........................ H03B 1/00; H03B 1/04

[58] Field of Search ......... 317/11 E, 11 R; 307/134, 307/247 A; 328/162, 164, 165; 340/365 E

[56] References Cited

UNITED STATES PATENTS

| | | | |
|---|---|---|---|
| 2,864,007 | 12/1958 | Clapper | 307/247 A |
| 3,195,056 | 7/1965 | Trautwein | 328/165 |
| 3,230,394 | 1/1966 | Kintner | 307/134 |
| 3,387,221 | 6/1968 | Arberman et al. | 328/165 |
| 3,753,007 | 8/1973 | Viswanathan | 328/162 |

*Primary Examiner*—David Smith, Jr.

[57] ABSTRACT

The present invention is designed to eliminate the chattering phenomenon in a control signal generated by a key switch or the like wherein the chattering components are present for a predetermined time period subsequent to the initiation and termination of the control signal. The invention includes a monostable circuit adopted to generate an intermediate signal upon the detection of the rising leading edge of the chattering components and for a given time thereafter. The duration of the intermediate signal is preset to be at least as long as the predetermined time period. Both the intermediate signal and the control signal are fed to a bistable circuit which generates an output signal during the control signal at a time determined by the termination of the intermediate signal. The bistable circuit continues to generate the output signal for a time determined by the termination of the control signal. In this manner, the output signal is substantially a duplication of the control signal with the chattering components thereof eliminated.

10 Claims, 2 Drawing Figures

[redacted]

CHATTERING IMMUNE CIRCUIT

Figure 1:
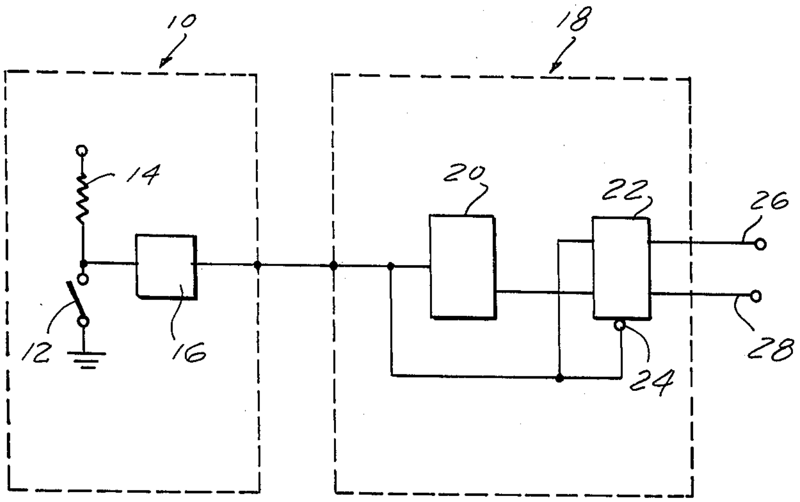

This invention relates to an electronic circuit for eliminating chattering components in a control signal and more particularly to a circuit for eliminating chattering components in a control signal which has a substantially instantaneous response thereby eliminating possible overlapping of sequential control signals.

Many electrical components, such as switches, relays and the like, are designed to open and close circuits by physically moving electrically conductive contacts relative to each other. Since there is a potential difference between the contacts, as the contacts come closer and closer together it becomes more and more likely that the potential difference between the contacts will be sufficient to cause one or more sparks to migrate across the gap between the contacts. Thus, if one were to take measurements of the magnitude of the signal as the contacts are closed, it would be obesrved that as the contacts are closed the signal magnitude does not exhibit a single abrupt change as one would theoretically expect. In actuality, a number of spikes occur immediately prior to the actual physical contact between the switch contacts. The spikes are caused by sparks which jump the gap as the contacts come in close proximity with each other. This phenomenon, often called the "chattering phenomenon," occurs in this type of component whenever the contacts are opened or closed thus completing or breaking a circuit.

In many instances the chattering component of a signal generated by these types of components may be extremely detrimental in that it may cause false operations in other circuit components designed to receive and process the signal. A prime example of this detrimental effect occurs in keyboard switch devices utilized to provide control signals for a computer or its terminal equipment.

Keyboard switch devices utilize a plurality of read switches, mechanical contact switches, conductive rubber contact switches or the like to generate control signals to a variety of different types of processing equipment. Because of the make and break contact operation of these types of switches, chattering components are inevitably present in the generated control signal. These chattering components are the most serious cause of false operation in the processing equipment adopted to receive the signals from the key switches.

As a means of preventing these types of false operations in the processing equipment, prior art circuitry designs have utilized the transient characteristics of the charge and discharge of a RC integrator circuit. The CR integrator circuit is designed to have a time constant which is slightly longer than the chattering component duration so as to absorb the chattering component. The output of the RC integrated circuit is then passed through a wave-shaping circuit so as to obtain the desired pulse signal output.

This method of eliminating chattering components, however, has a very serious inherent disadvantage in that the signal storage time in the RC integrated circuit must be relatively long and thus the circuit continues to generate the signal a considerable time after the key switch has been opened. A subsequent depression of the key may occur while the previous signal is still present in the RC integrated circuit. Thus, overlap between successive signals is likely, especially where a plurality of key switches are arranged on a signal panel, such as a keyboard, and they are depressed at a high repetition speed by a skilled operator using both hands. This overlapping causes the number of signal outputs to be different from the repetition number of key depressions and therefore eliminates the possibility of reproducing the control information with complete fidelity.

It is, therefore, a prime object of the present invention to provide a chattering immune circuit adopted for use with a keyboard switch device or the like.

It is a further object of the present invention to provide a chattering immune circuit which may be designed to have no signal storage time after the termination of the control signal so as to eliminate the possibility of overlapping of sequential signal outputs and therefore enable reproduction of control information given by manual operation of a key switch with complete fidelity.

In accordance with the present invention, a control signal input containing chattering components, such as would be produced by manual key depression of a key switch, is supplied to the input terminal of a delay circuit such as a monostable multivibrator and also to the input and reset terminals of a bistable circuit such as a D-type flip-flop. The delay circuit is triggered by the initial rising edge portion of the chattering component caused when the control signal is initiated or terminated. The triggering of the delay circuit causes the circuit to generate an intermediate signal having a pulse width at least as wide as the duration of the chattering component. At a time determined by the termination of the intermediate signal, i.e. the monostable multivibrator returning to its original state, and occurring during the presence of the control signal, the bistable circuit starts generating the output signal. This output signal is a reproduction of the control signal with the chattering component eliminated. The bistable circuit is reset to terminate the output signal at a time determined by the initial falling of the edge portion of the control signal when the control terminates. Preferably the circuit is designed such that no signal storage occurs after the termination of the control signal. This may be achieved by causing the output signal to terminate simultaneously with the release of the key switch. It is therefore possible to reproduce a control information with complete fidelity, even if the repetition speed of key depression is relatively high.

Figure 2:
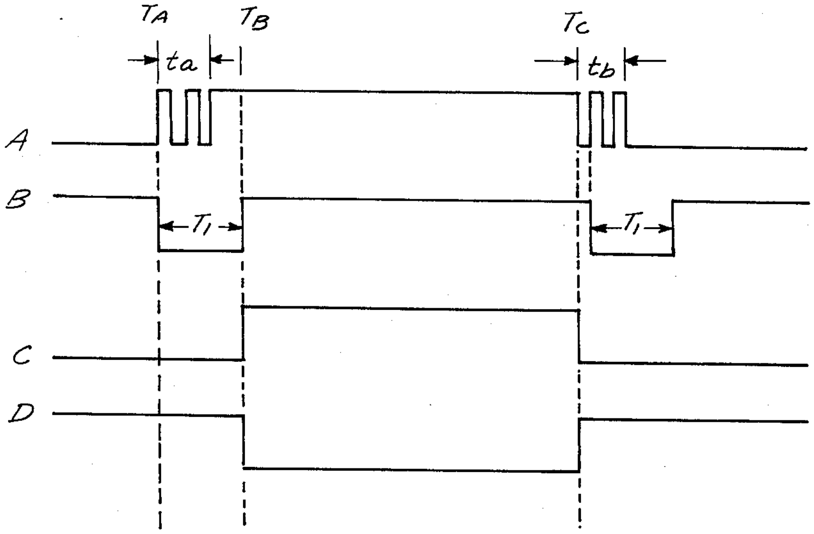

To the accomplishment of the above and to such other objects as may hereinafter appear, the present invention relates to a chattering immune circuit as defined in the appended claims and as described in the specification, taken together with the accompanying drawings in which:

FIG. 1 is a block diagram of a preferred embodiment of the circuit of the present invention; and FIG. 2 is a graphical representation of the signal levels occurring at various portions of the circuit of the preferred embodiment of the present invention.

FIG. 1 shows a keyboard circuit, generally designated 10, having a key switch 12, one terminal of which is connected to ground. The other terminal of switch 12 is connected to a positive voltage source (not shown) through a resistor 14. A junction node between switch 12 and resistor 14 is connected to an inverter circuit 16 of conventional design. Thus, when switch 12 is opened, inverter 16 receives a positive signal and generates a control signal at a particular discrete logic level, which, for the purposes of this disclosure is considered to be "off." On the other hand, when the switch 12 is closed, inverter circuit 16 receives no signal and generates a control signal at another discrete logic level, which for the purposes of this disclosure is considered to be "on." Thus, when the switch 12 is opened, inverter circuit 16 generates no control signal but when switch 12 is closed, inverter circuit 16 generates a control signal during the period of time that switch 12 remains closed. For the reasons discussed above, the opening and closing of switch 12 causes chattering components to be generated by inverter circuit 16 as the control signal initiates and terminates.

The control signal from inverter circuit 16 is fed to the chattering immune circuit of the present invention, generally designated 18. Circuit 18 includes a delay circuit 20, preferably in the form of a conventional monostable multivibrator, and a bistable circuit 22, preferably consisting of a commercially available D-type flip-flop circuit. Multivibrator 20 has its input connected to receive the control signal from circuit 16. Bistable circuit 22 has two inputs, one of which receives the control signal from circuit 16 and the other of which receives an intermediate signal generated by multivibrator 20. Bistable circuit 22 also has a reset terminal 24, which is also connected to receive the control signal from circuit 16. Bistable circuit 22 has a pair of output terminals 26 and 28. The output signal corresponding to the control signal (with the chattering components eliminated) will appear at terminal 26 and the inversion thereof will appear at terminal 28.

FIG. 2 shows four separate graphical representations of signal forms occurring within the circuit designated as A, B, C, and D respectively, all of which are plotted against the same time axis. Plot A represents the control signal as generated by inverter circuit 16. Plot B represents the intermediate signal as generated by monostable multivibrator 20. Plots C and D represent the output signal as generated by bistable circuit 22 at terminals 26 and 28 respectively. The time at which switch 12 is depressed is designated as $T_A$. The time at which switch 12 is released is designated as $T_C$. The chattering components caused when switch 12 is depressed and released are designated as $t_a$ and $t_b$, respectively. The pulse width of the intermediate signal generated by monostable multivibrator 20 is designated $T_1$ and is preset to be slightly larger than either of the chattering components $t_a$ and $t_b$.

Referring to plot A, when switch 12 is depressed at time $T_A$, inverter circuit 16 generates the control signal which has the chattering component of duration $t_a$ at the initiation thereof. After the chattering components have ceased, the signal is maintained at a stable level. When switch 12 is released at time $T_C$, inverter circuit 16 terminates the control signal and a chattering component of duration $t_b$ occurs. Thus, $t_a$ may be considered the "turning on time" of the switch, and $t_b$ can be considered the "turning off time" of the switch. Therefore, the depression and release of switch 12 will generate a control signal as shown by A.

Control signal A is transmitted to the chattering immune circuit 18 and applied to the input terminal of monostable multivibrator 20. Monostable multivibrator 20 is triggered by the initial rising edge portion of the chattering component produced at time $T_A$ and will generate an intermediate signal at its output terminal. The intermediate signal is of duration $T_1$ as shown by waveform B. The pulse width $T_1$ of the intermediate signal is at least as wide as the longer of $t_a$ or $t_b$ and preferably slightly wider. The control signal is fed to one input terminal of bistable circuit 22, and the intermediate signal from multivibrator 20 is fed to the other input signal thereof. The output signal cannot be initiated, except in the presence of the control signal. The termination of the intermediate signal determines the time at which the bistable circuit will start to generate the output signal. Preferably, this will occur upon the coincidence of the control signal and the actual termination of the intermediate signal, which as shown here, occurs at time $I_B$. Thus, bistable circuit 22 will generate an output signal at terminal 26 which is substantially the equivalent to the control signal with the elimination of the chattering components caused by the depression of the key switch. This is shown by waveform C. Simultaneously, the inversion of the output signal occurring at terminal 26 is generated at terminal 28 as shown by waveform D. Thus, the output signals at terminals 26 and 28 are stable signal waves which are out-of-phase with each other.

The control signal is also applied to the reset terminal 24 of bistable circuit 22 such that bistable circuit 22 is reset to its original condition at a time determined by the falling edge portion of the control signal caused by the release of switch 12. Preferably, circuit 22 is reset at a time such that the chattering component caused by the release of switch 12 occurs immediately after the falling edge portion of the termination of the control signal which changes the state of the bistable circuit. Thus it is preferable to have the reset operation occur simultaneously with the occurrence of the falling edge portion of the termination of the control signal such that no portion of the chattering components caused by the release of switch 12 appears in the output signal. It should be noted that while multivibrator 20 also generates the intermediate signal upon reception of the rising edge of the chattering component after the termination of the control signal, this intermediate signal has no effect on the output signal as it occurs after the termination thereof.

Since, preferably, the output signal and the control signal both terminate their state at precisely the same instant, i.e. $T_C$, any chattering components occurring in the control signal after time $T_C$ are effectively eliminated from the output signal. Further, simultaneous termination of the output signal and the control signal at time $T_C$ is preferable as it permits the circuit to have substantially no signal storage time which can cause overlapping with a subsequent control signal.

Thus, the chattering immune circuit of the present invention effectively eliminates the chattering component from the control signal while also eliminating or substantially reducing the signal storage time, therefore making it possible to reproduce control information with complete fidelity even if the repetition speed of key depression is very high. In addition, the circuit of the present invention accomplishes this function through the use of a relatively simple circuit configuration utilizing only commercially available components.

While but a single embodiment of the present invention has been described herein for purposes of illustration, it is apparent that many variations and modifications may be made thereto. It is intended to cover all of these variations and modifications which fall within the scope of the invention as defined by the following claims.

I claim:

1. A chattering immune circuit for use with means for generating a control signal having chattering components present therein for a pre-determined period subsequent to the initiation thereof, said circuit comprising a monostable multivibrator, said monostable multivibrator being operably connected to said control signal generator means and effective to generate an intermediate signal upon the detection of the rising edge portion of said chattering components and for a given time thereafter, said given time being at least as long as said pre-determined time, and means operatively connected to said monostable multivibrator for generating an output signal comprising means for causing said output signal to commence at a time determined by the termination of said intermediate signal and means for causing said output signal to terminate simultaneously with the termination of said control signal.

2. A chattering immune circuit for use with means for generating a control signal having chattering components present therein for a pre-determined period subsequent to the initiation thereof, said circuit comprising means for generating an intermediate signal, said intermediate signal generating means being operatively connected to said control signal generating means and effective to generate said intermediate signal upon the initiation of the chattering components and for a given time thereafter, said given time being at least as long as said pre-determined time, and a bistable circuit operatively connected to said control signal generating means and said intermediate signal generating means. said circuit having first and second input terminals connected to receive said control signal and said intermediate signal, respectively, a reset terminal connected to receive said control signal and an output terminal upon which an output signal is generated, said bistable circuit being effective, upon the receipt of said intermediate signal, to generate said output signal and upon the detection of the termination of said control signal, to simultaneously terminate said output signal.

3. The circuit of claim 2 wherein said bistable circuit comprises a D-type flip-flop circuit.

4. A chattering immune circuit for use with means for generating a control signal having chattering components present therein for a pre-determined period subsequent to the initiation thereof, said circuit comprising means for generating an intermediate signal, said intermediate signal generating means being operably connected to said control signal generating means and effective to generate said intermediate signal upon the initiation of the chattering components and for a given time thereafter, said given time being at least as long as the pre-determined time, and means operably connected to said intermediate signal generating means and said control signal generating means for generating an output signal comprising means for causing said output signal to commence at a time determined by the termination of said intermediate signal and means for causing said output signal to terminate simultaneously with the receipt of the falling edge portion of the chattering component caused by the termination of the control signal.

5. A chattering immune circuit for use with means for generating a control signal having chattering components present therein for a pre-determined period subsequent to the initiation thereof, said control circuit comprising means for generating an intermediate signal, said intermediate signal generating means being operably connected to said control signal generating means and effective to generate said intermediate signal upon the detection of the rising edge portion of the chattering components and for a given time thereafter, said given time being at least as long as said pre-determined time, and a bistable circuit operably connected to said intermediate signal generating means and said control signal generating means having first and second input terminals connected to receive said control and intermediate signals respectively, and a reset terminal connected to receive said control signal, said bistable circuit being effective to generate an output signal at a time determined by the termination of said intermediate signal and to cause said output signal to terminate simultaneously with the termination of said control signal.

6. The circuit of claim 5 wherein said intermediate signal generating means is a monostable multivibrator.

7. The circuit of claim 5 wherein said bistable circuit comprises a D-type flip-flop circuit.

8. The circuit of claim 7 wherein said intermediate signal generating means is a monostable multivibrator.

9. A chattering immune circuit for use with means for generating a control signal having chattering components present therein for pre-determined periods subsequent to the initiation thereof, said circuit comprising means for generating an intermediate signal, said intermediate signal generating means being operably connected to said control signal generating means and effective to generate said intermediate signal upon the detection of the rising edge portion of the chattering components and for a given time thereafter, said given time being at least as long as said pre-determined time, and means operably connected to said intermediate signal generating means and said control signal generating means for generating an output signal comprising means for causing an output signal to commence at a time determined by the termination of said intermediate signal and means for causing said output signal to terminate simultaneously with the receipt of the falling edge portion of the chattering component caused by the termination of said control signal.

10. The circuit of claim 9 wherein said intermediate signal generating means is a monostable multivibrator.

* * * * *